United States Patent
Callan et al.

(10) Patent No.: US 7,400,340 B2
(45) Date of Patent: Jul. 15, 2008

(54) DATA MIXER FOR PORTABLE COMMUNICATIONS DEVICES

(75) Inventors: Wilson Callan, Marstons Mills, MA (US); Rajat Ghai, Sandwich, MA (US)

(73) Assignee: Starent Networks, Corp., Tewksbury, MA (US)

( * ) Notice: Subject to any disclaimer, the term of this patent is extended or adjusted under 35 U.S.C. 154(b) by 534 days.

(21) Appl. No.: 10/989,174

(22) Filed: Nov. 15, 2004

(65) Prior Publication Data

US 2006/0104347 A1    May 18, 2006

(51) Int. Cl.
*H04N 7/15* (2006.01)
(52) U.S. Cl. .................. 348/14.02; 348/14.09
(58) Field of Classification Search ............. 348/14.09, 348/14.08, 14.07, 14.02, 14.01
See application file for complete search history.

(56) References Cited

U.S. PATENT DOCUMENTS

| 6,124,881 A | 9/2000 | Terui et al. |
| 7,145,594 B2 | 12/2006 | Seo et al. |
| 2001/0047300 A1* | 11/2001 | Takashima et al. ............ 705/14 |
| 2004/0047461 A1* | 3/2004 | Weisman et al. ....... 379/202.01 |
| 2004/0119814 A1* | 6/2004 | Clisham et al. .......... 348/14.08 |
| 2005/0151836 A1* | 7/2005 | Ni ........................... 348/14.09 |
| 2005/0157164 A1* | 7/2005 | Eshkoli et al. ........... 348/14.07 |

OTHER PUBLICATIONS

International Search Report and Written Opinion issued for corresponding International Application No. PCT/ US2005/041210 Oct. 23, 2007.

* cited by examiner

*Primary Examiner*—Stella L Woo
(74) *Attorney, Agent, or Firm*—Wilmer Cutler Pickering Hale and Dorr LLP

(57) ABSTRACT

Methods and systems are provided for combining a plurality of data streams into a single data stream for sending to a wireless user. According to the invention, using one or more data mixers, two or more video streams are combined into a single video stream and provided to a wireless user, and/or two or more audio streams are combined into a single audio stream and provided to a wireless user. The streams are optionally decoded and handled in raw format by the data mixer, and at least some of the streams may be buffered in a queue so that "slipping" or synchronization problems can be addressed. The method and system can process media data such as video, audio, text, or other media data.

29 Claims, 12 Drawing Sheets

200

| Input to User | Stream | Combination of Streams |
|---|---|---|
| Audio to User 110 | 116 | (122+132) |
| Video to User 110 | 117 | (123+133) |
| Audio to User 120 | 126 | (112+132) |
| Video to User 120 | 127 | (113+133) |
| Audio to User 130 | 136 | (112+122) |
| Video to User 130 | 137 | (113+123) |

FIG. 2

| Black | |
|---|---|
| A0  A2  A4  A6  ... <br> B0  B2  B4  B6  ... <br> D0  D2  D4  D6  ... <br> E0  E2  E4  E6  ... <br> G0  G2  G4  G6  ... <br> ... | A0  A2  A4  A6  ... <br> B0  B2  B4  B6  ... <br> D0  D2  D4  D6  ... <br> E0  E2  E4  E6  ... <br> G0  G2  G4  G6  ... <br> ... |
| Black | |

FIG. 12

DATA MIXER FOR PORTABLE COMMUNICATIONS DEVICES

FIELD OF THE INVENTION

The present invention relates to the field of data communications. More particularly, this invention relates to combining multiple audio communication streams and/or multiple video communication streams from more than one source into a single audio stream and/or a single video stream for sending to a wireless device.

BACKGROUND OF THE INVENTION

Electronic conferencing capabilities exist for desktop computers and telephone equipment, whereby several conference participants exchange audio and/or video information with one another. Unlike traditional point-to-point communications between two ends of a communication link (as with, e.g., ordinary telephone calls), conferencing usually involves three or more parties. For example, in the video conferencing context, a given party generally desires to see and hear two or more other parties to the conference ("conference participants" or "conferees"), preferably at the same time.

Vendors currently sell systems and services that provide such electronic conferencing capabilities. In order to accommodate the multiple conferees simultaneously taking part in a conference, these systems need to handle greater processing and bandwidth loads than ordinary communications systems. As a result, these systems and services can be relatively expensive to buy or lease, and they also demand high-capacity network capabilities. Additionally, these systems are generally larger than their non-conferencing counterparts, and are thus not readily portable or mobile.

Recently, wireless service providers and wireless telephone makers have begun to offer "camera phones" and "video phones," generally as consumer novelty items. Camera phones are provided with a camera lens, digital camera hardware, and software that enable them to take photographs. Once taken, these photographs may be, for example, transmitted directly to other wireless users, or sent as email attachments.

With video phones, for example, a video clip consisting of a collection of still images, or frames of video, is captured and generally compressed into an electronic file. Like photographs, a video clip may be transmitted directly to other wireless users as a video stream, or sent as email attachments, for example. Video streams received by wireless devices are generally processed and displayed using media player programs built into the receiving wireless devices.

Traditionally, video streams have been sent and received by wireless devices in a batch mode, rather than in real-time, in order to reduce the consumption of computing and bandwidth resources. More recently, multimedia wireless devices have been offered that are able to receive and display a video stream (and play audio) in substantially real-time.

Currently available wireless devices (e.g., video phones), however, are not able to receive and process more than one audio stream at any given time or more than one video stream at any given time. Therefore, these devices are generally not adapted to provide video conferencing functionality, whereby, for example, a user can enjoy hearing and/or seeing more than one other participant in a conference at the same time.

Accordingly, it is desirable to provide methods and systems for combining a plurality of data streams (e.g., two or more audio signals and/or two or more video signals) into a single voice stream and/or a single video stream for sending to a wireless user.

SUMMARY OF THE INVENTION

Methods and systems are provided for combining a plurality of data streams into a single data stream for sending to a wireless user. According to the invention, using one or more data mixers, two or more video streams are combined into a single video stream, and/or two or more audio streams are combined into a single audio stream. The resulting audio stream and/or video stream are then sent to a wireless device to be processed and played out to a user.

In one embodiment, the invention provides a method for combining at least two streams of data, each from respective wireless devices, wherein the method includes receiving a first stream of data from a first wireless device, receiving a second stream of data from a second wireless device, decimating at least one of the first and second streams of data, combining the remaining first and second streams of data after the decimating at least one of the first and second streams of data to form a combined stream of data having data representing each of said first and second streams of data, and delivering the combined stream of data to a third wireless device.

In a second embodiment, the invention provides a method for combining at least two streams of video data, each from respective wireless devices, wherein the method includes receiving a first stream of video data from a first wireless device that fits a first portion of image space, receiving a second stream of video data from a second wireless device that fits a second portion of image space that is substantially different from the first portion of image space, and combining the first and second portions of image space into a single image space of a combined video stream that is suitable for sending to a third wireless device.

In a third embodiment, the invention provides a system for combining at least a first data stream received from a first wireless device and a second data stream received from a second wireless device into a combined data stream suitable for delivery to a third wireless device, wherein the system includes at least one data buffer for buffering at least some of the second data stream and potentially buffering at least some of the first data stream, and a data mixer for combining at least some of the potentially buffered first data stream with at least some of the buffered second data stream to form a combined data stream having data representing both of the first and second data streams.

In a fourth embodiment, the invention provides a system for combining at least a first data stream received from a first wireless device and a second data stream received from a second wireless device into a combined data stream suitable for delivery to a third wireless device, wherein the system includes means for buffering at least some of the second data stream, and means for combining at least some of the first data stream with at least some of the buffered second data stream to form a combined data stream having data representing both of the first and second data streams.

In a fifth embodiment, the invention provides a data mixer that receives at least a first data stream from a first wireless device and a second data stream from a second wireless device, the data mixer that combines at least some of the first data stream with at least some of the second data stream to form a combined data stream having data representing both of the first and second data streams, wherein the combined data stream is suitable for delivery to a third wireless device.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which:

FIG. 2 shows a table listing the respective audio and video streams that are combined and provided to each of the three conferees of FIG. 1 according to one embodiment of the present invention;

FIG. 12 is a simplified illustration showing the remaining bytes of video data from the master video frame of FIG. 10A and the slave video frame of FIG. 10B corresponding to the combined video frame of FIG. 10G according to one embodiment of the present invention.

DETAILED DESCRIPTION OF THE INVENTION

Methods and systems are provided for combining a plurality of data streams (e.g., two or more audio streams and/or two or more video streams) into a single voice stream and/or a single video stream for sending to a wireless user. It will be understood that certain features which are well known in the art are not described in great detail in order to avoid complication of the subject matter of the present invention.

According to the principles of the present invention, a communication server (referred to herein as a "media conferencing server") is described that provides conferencing capability to users of wireless devices. As explained below, the server combines (e.g., mixes or merges) two or more incoming audio and/or two or more video streams from a corresponding plurality of conferees into a single audio stream and/or a single video stream for sending to a wireless device (e.g., the video phone of a user who is participating in an audio/video conference). The wireless devices that can benefit from this inventive concept include, for example, currently-available wireless telephones that are provided with video capability (video phones). That is, the combination of the plurality of video and/or audio streams is done transparently to the user's device that receives the combined stream (s), such that neither the device nor the software running thereon needs to be modified or upgraded.

Figure 1:
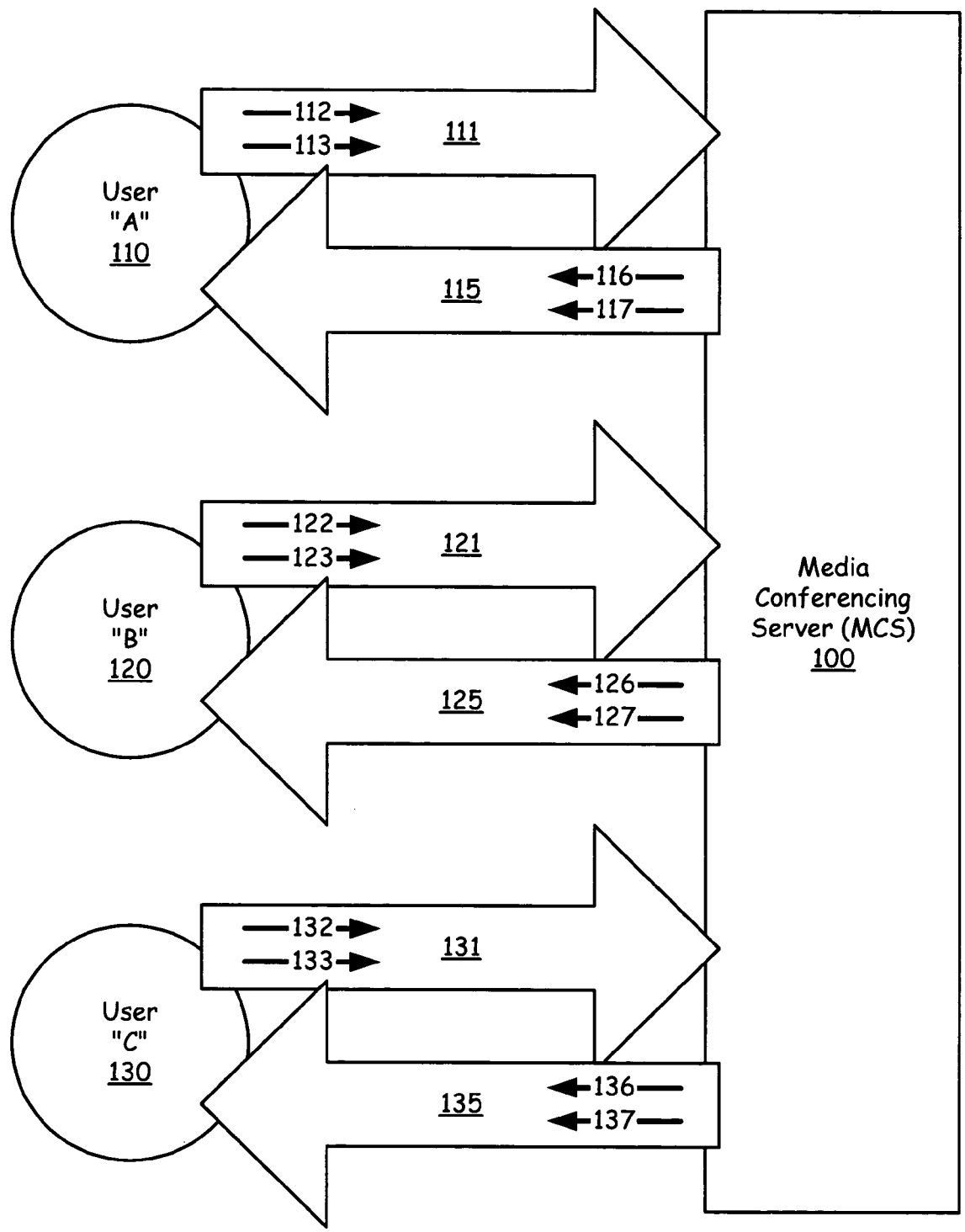
FIG. 1 is a simplified illustration showing the respective data streams sent and received by three conferees using a media conferencing server according to one embodiment of the present invention.

FIG. 1 is a simplified illustration showing the data streams sent and received by three conferees (users 110, 120, and 130, respectively labeled as users "A," "B" and "C") that are coupled through a media conferencing server (MCS) 100 according to the principles of the present invention. It will be understood that, when a particular user is described herein as sending or receiving data, generally speaking, it is a wireless device associated with the user that performs this action. In these instances, references to a user sending or receiving data are made solely for the sake of simplifying the description of the present invention.

As shown, user 110 sends a data stream 111, including an audio stream 112 and a video stream 113, to MCS 100. Additionally, user 110 receives a data stream 115 that includes an audio stream 116 and a video stream 117 from MCS 100. User 120, on the other hand, sends a data stream 121 that includes an audio stream 122 and a video stream 123 to MCS 100, and receives a data stream 125 that includes an audio stream 126 and a video stream 127 from MCS 100. Finally, as shown in FIG. 1, user 130 sends a data stream 131 that includes an audio stream 132 and a video stream 133 to MCS 100, and receives a data stream 135 that includes an audio stream 136 and a video stream 137 from MCS 100. It will be understood that, although both audio and video streams are sent and received by each of users 110, 120, and 130, the invention is not limited in this manner. For example, it is contemplated that users 110, 120, and 130 may desire, at times, to participate in an audio only, or video only, conference. Moreover, according to various embodiments of the present invention, one or more of users 110, 120, and 130 may at times receive only an audio stream, for example, due to bandwidth limitations. For example, MCS 100 may receive an indication from one or more network elements during an audio/video conference that there is not enough bandwidth to deliver a video stream as well as an audio stream to user 130. In such cases, MCS 100 may, for example, reduce the quality or attributes (e.g., frames per second) of the video being delivered to user 130 (in order to reduce bandwidth), or completely terminate the video stream to user 130 (at least temporarily). In this case, as additional bandwidth becomes available, the terminated video stream or the video attributes or quality of a non-terminated video stream can be restored by MCS 100.

As explained above, each user shown in FIG. 1 sends only one audio stream and one video stream (i.e., the user's own audio and video streams). However, each user receives an audio stream that includes audio data from both of the other two conferees, as well as a video stream that includes video data from both of the other two conferees. For example, while user 110 only sends his own audio stream 112 and video stream 113 to MCS 100 (some or all of which is to be delivered to the other conferees), user 110 receives an audio stream 116 that represents a merger (combination) of audio streams 122 and 132 from users 120 and 130, respectively. To further clarify this point, table 200 of FIG. 2 lists the respective audio and video stream combinations that are sent to users 110, 120, and 130 of FIG. 1.

According to various embodiments of the invention, both audio and video data mixers are provided at MCS 100 for combining audio and video streams, respectively. These data mixers may be implemented, for example, in the ST-16 Intelligent Mobile Gateway from Starent Networks of Tewksbury, Mass., USA. It should be noted that, generally speaking, MCS 100 will include a separate audio and video data mixer for each conferee (e.g., for each of users 110, 120, and 130).

Figure 3:
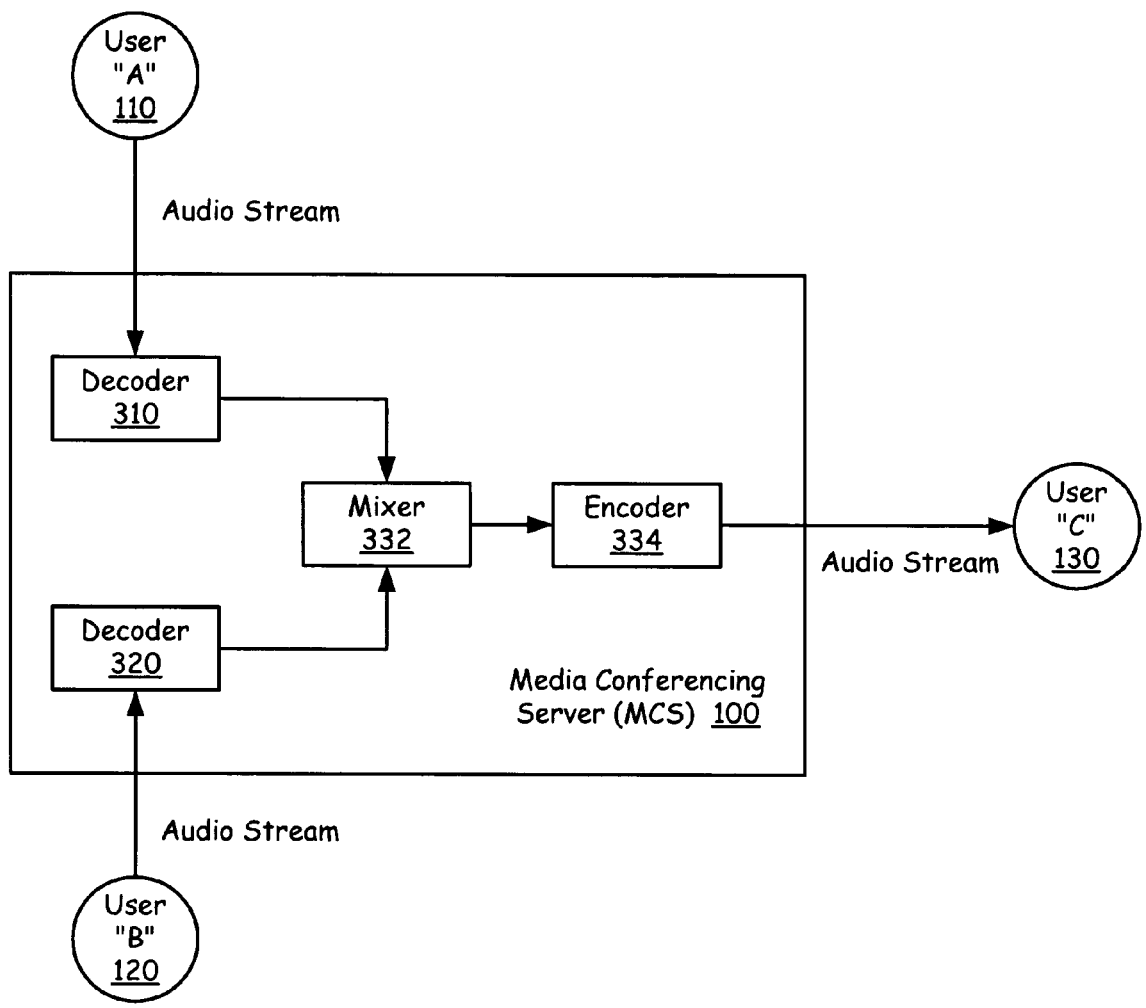
FIG. 3 is a more detailed, but still simplified, illustration of the media conferencing server of FIG. 1 showing various components that are used to provide a combined audio stream to one of the three conferees according to one embodiment of the present invention.

FIG. 3 is a more detailed, but still simplified, illustration of MSC 100 showing various components that are used to provide a combined audio stream to user 130 from separate audio streams originating from users 110 and 120. As shown, using MCS 100, respective audio streams from users 110 and 120 are combined and provided to user 130. In particular, user 110 sends a stream of audio to decoder 310, and user 120 sends a stream of audio to decoder 320. In turn, decoders 310 and 320 decode the incoming audio signals according to the particular format in which they were encoded at the respective devices of users 110 and 120. For example, assume the audio streams being sent to MCS 100 are first encoded by the respective devices of users 110 and 120 in the Adaptive Multi-Rate (AMR) standard codec format (sampled at, for example, 8 kHz). In this case, decoders 310 and 320 convert the AMR data, for example, into 16-bit raw pulse code modulation (PCM) audio format.

Audio mixer 332 shown in FIG. 3 receives the decoded audio streams from decoders 310 and 320, and combines these streams into a single output audio stream (as explained in detail below). The single combined output audio stream is then provided to encoder 334 to be converted from the raw format (e.g., PCM) into an encoded format (e.g., AMR). The single, encoded output audio stream is then provided to the wireless device of user 130 to be optionally decoded and played out for user 130.

Figure 4:
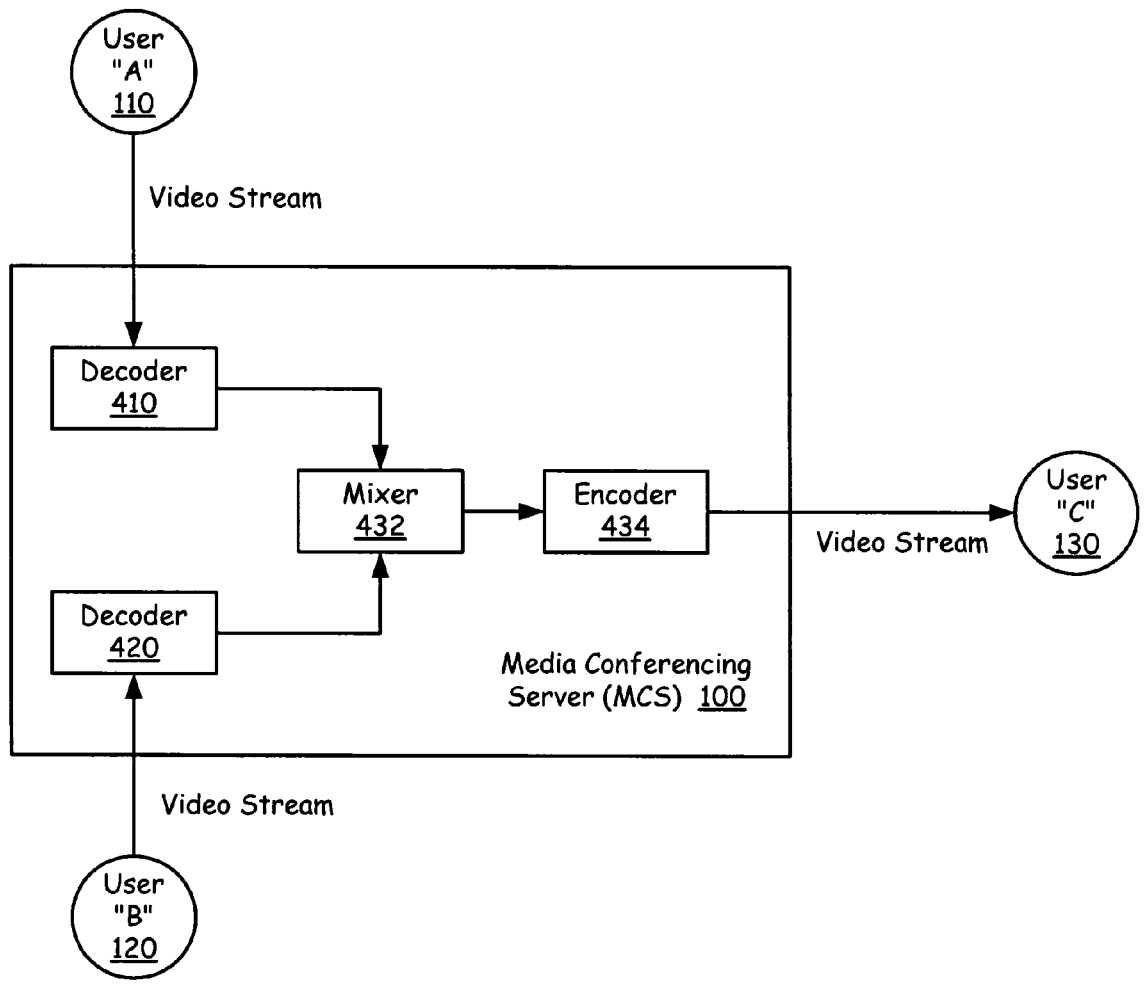
FIG. 4 is a more detailed, but still simplified, illustration of the media conferencing server of FIG. 1 showing various components that are used to provide a combined video stream to one of the three conferees according to one embodiment of the present invention.

As mentioned above, according to various embodiments, MCS 100 includes separate audio and video data mixers for each of users 110, 120, and 130. FIG. 4 is a more detailed, but still simplified, illustration of MSC 100 showing various components that are used to provide a combined video stream to user 130 from separate video streams originating from users 110 and 120. As shown, respective video streams from users 110 and 120 are combined and provided to user 130. In particular, user 110 sends a stream of video to decoder 410, and user 120 sends a stream of video to decoder 420. In turn, decoders 410 and 420 decode the incoming video signals according to the particular format in which they were encoded at the respective wireless devices of users 110 and 120. For example, assume the video streams being sent to MCS 100 are first encoded by the respective devices of users 110 and 120 from a raw format (e.g., YUV 4:2:0) into the standard MPEG-4 format (e.g., at a QCIF resolution of 176×144) in order to conserve computational resources and bandwidth. In this case, decoders 410 and 420 convert the compressed (MPEG-4) data, for example, back to the raw format of YUV 4:2:0.

Video mixer 432 shown in FIG. 4 receives the decoded video streams from decoders 410 and 420, and combines these streams into a single output video stream (as explained in detail below). The single output video stream is then provided to encoder 434 for conversion from the raw format (e.g., YUV 4:2:0) into an encoded format (e.g., MPEG-4). The single, encoded output video stream is then provided to the device of user 130 to be optionally decoded and played out for user 130.

For the sake of simplicity, the components of MCS 100 used to provide a combined audio/video streams to users 110 and 120 are not shown in either of FIGS. 3 and 4. However, it will be understood that, according to various embodiments of the present invention, users 110 and 120 are both provided with similarly dedicated decoders and mixers on MSC 100, such that these users can receive combined output audio and video streams that result from mixing together incoming audio and video streams from the other two conferees.

Figure 5:
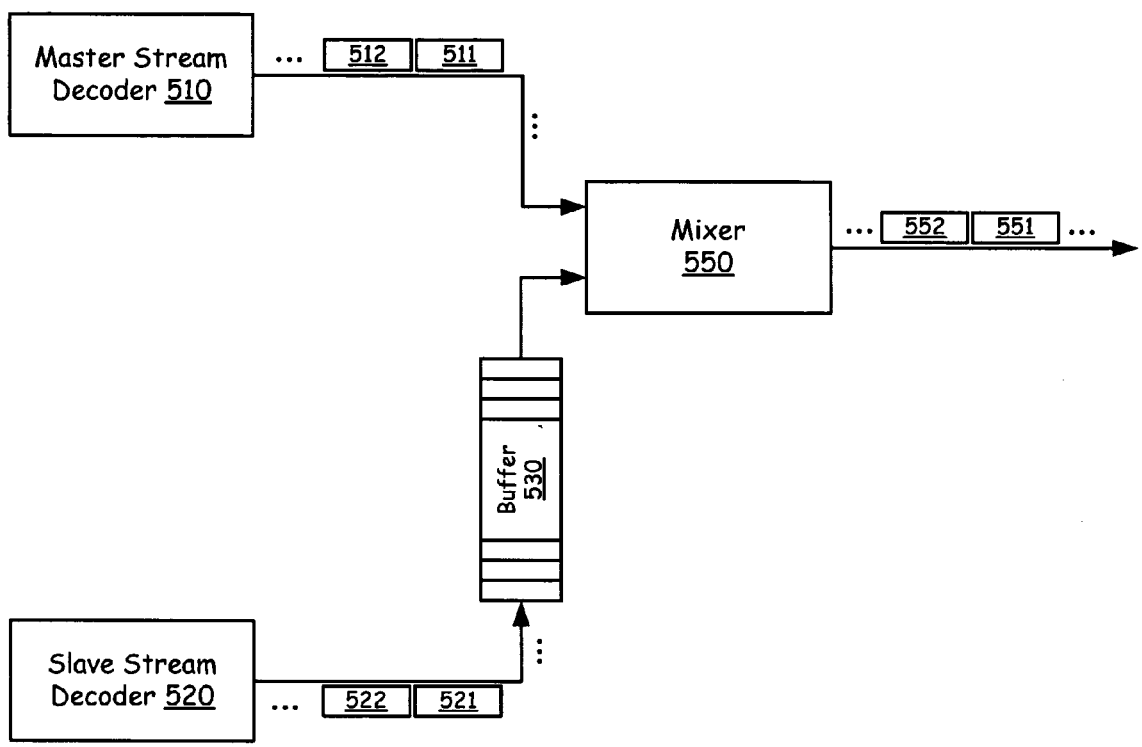
FIG. 5 is a simplified illustration showing the manner in which data from a master stream and a slave stream are combined according to one embodiment of the present invention.

The operation of a data mixer according to various embodiments of the present invention is now described in greater detail with reference to FIG. 5. It should be noted that, as described further below, data mixer 550 will operate differently depending on whether it is an audio mixer (such as audio mixer 332) or a video mixer (such as video mixer 432). As shown in FIG. 5, a primary, or "master" stream decoder 510 delivers a stream of either audio or video data including, e.g., packets 511, 512, etc. to data mixer 550 (which is either an audio or data mixer). Secondary, or "slave" stream decoder 520, on the other hand, delivers a stream of either audio or video data (being the same type of data as that delivered by decoder 510) including, e.g., packets 521, 522, etc. to a data buffer 530. In the embodiment of the present invention shown in FIG. 5, buffer 530 is a first-in-first-out (FIFO) buffer (or queue) that, unless full, temporarily stores packets 521, 522, etc. before delivering them to data mixer 550. As will be understood by persons versed in the art, one of the purposes of buffering the slave stream is to account for synchronizing errors between the two streams of data, such as those arising from network delays. This arrangement helps to prevent (or at least reduce) "slipping" between the two incoming data streams. Moreover, the size of buffer 530 is selected according to the requirements of the application at hand, and the type of data being carried in a given stream. For example, audio data may be buffered for a total of about ½ of a second. This buffering would allow for normal network congestion delays to be resolved, but is not so long as to create an unnaturally long delay in the spoken voice stream that would confuse or disturb a listener.

As described in greater detail below with regard to both audio and video data, data mixer 550 combines data received from master stream decoder 510 and slave stream decoder 520 to provide a single combined output stream (whether audio or video). For example, assuming the packets shown in FIG. 5 are audio packets, and that data mixer 550 is an audio mixer, data mixer 550 is used to replace (e.g., overwrite) approximately half of the data in each packet received from master stream decoder 510 with data received from slave master stream decoder 520 (such that, for example, packet 551 includes a combination of the information received from packets 511 and 521). Therefore, according to the invention, a recipient of the combined audio output stream from data mixer 550 (including, e.g., packets 551, 552, etc.) receives real-time audio data from both the master audio stream (via decoder 510) and the slave audio stream (via decoder 520).

It should be noted that it is generally not decisive as to which of two incoming audio or video streams is designated the master stream and which is designated the slave stream.

For example, according to one embodiment, the first incoming stream to make a data connection with MCS 100 may be designated the master stream. According to another embodiment, for example, the stream from the user who is the conference organizer may be given higher priority by designating it as the master stream.

Figure 6:
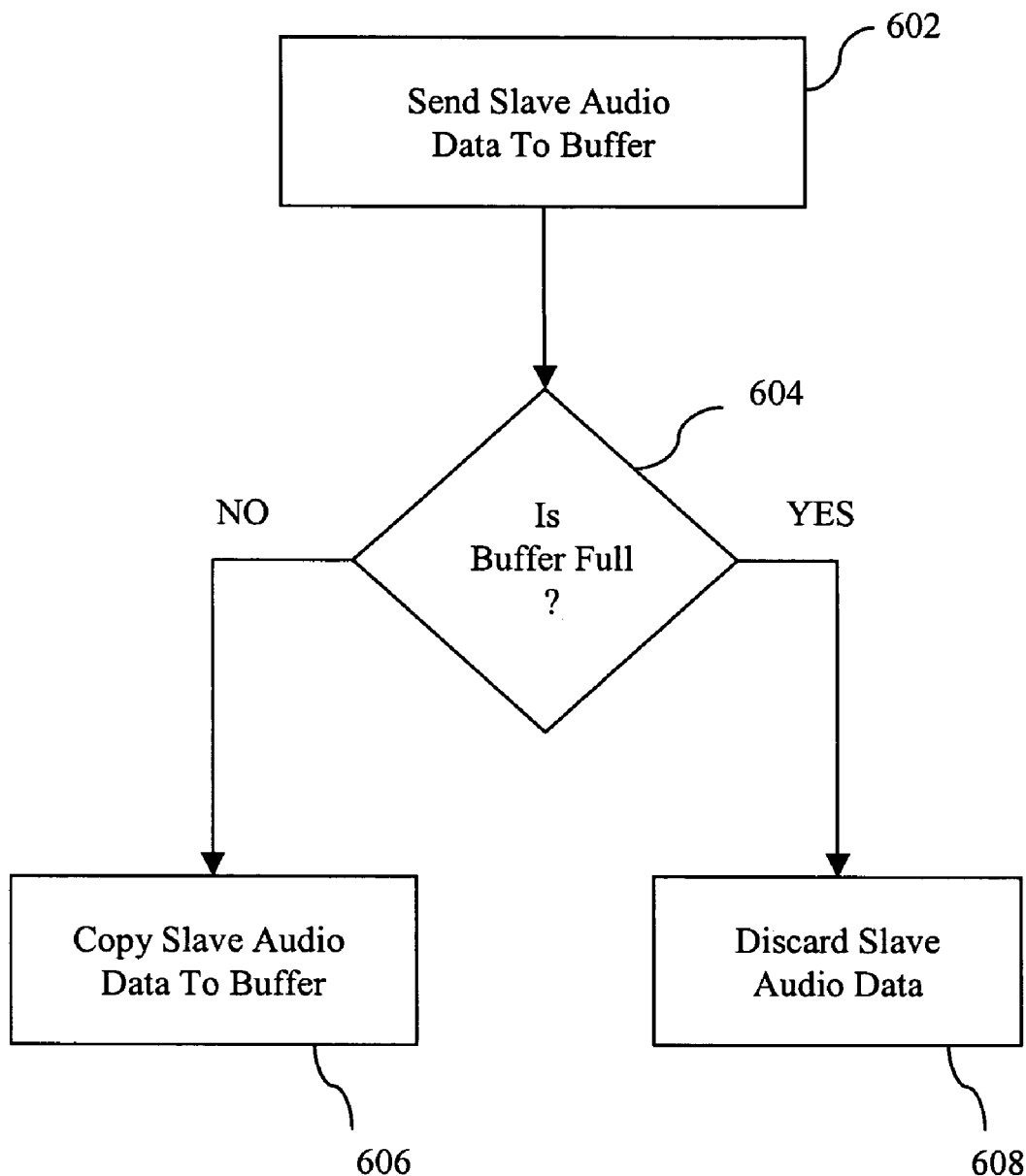
FIG. 6 is a simplified flow chart illustrating the steps carried out in relation to the buffering of audio data from a slave stream, to be later combined with audio data from a master stream, according to one embodiment of the present invention.

The use of an audio mixer to combine audio streams from two conferees (e.g., users 110 and 120) to be provided in a single audio stream to a third conferee (e.g., user 130) is now discussed. FIG. 6 is a simplified flow chart illustrating the steps carried out in relation to the buffering of data from a slave audio stream with respect to the components shown in FIG. 5 (e.g., assuming that packets 521, 522, etc. include audio data and that data mixer 550 is an audio mixer). At step 602, audio data (e.g., one or more of audio packets 521, 522, etc.) from the slave audio stream is sent to buffer 530. If at step 604 it is determined that buffer 530 is full, then at step 606, the audio data is discarded (e.g., it is dropped or lost). This generally occurs when the master stream is interrupted for an appreciable amount of time, or "slips" behind the slave stream's data rate, causing buffer 530 to overflow (and thus causing audio frames from the slave stream to be lost until resynchronization occurs). On the other hand, if it is determined at step 604 that buffer 530 is not full, the audio data from the slave audio stream is placed into buffer 530.

Figure 7:
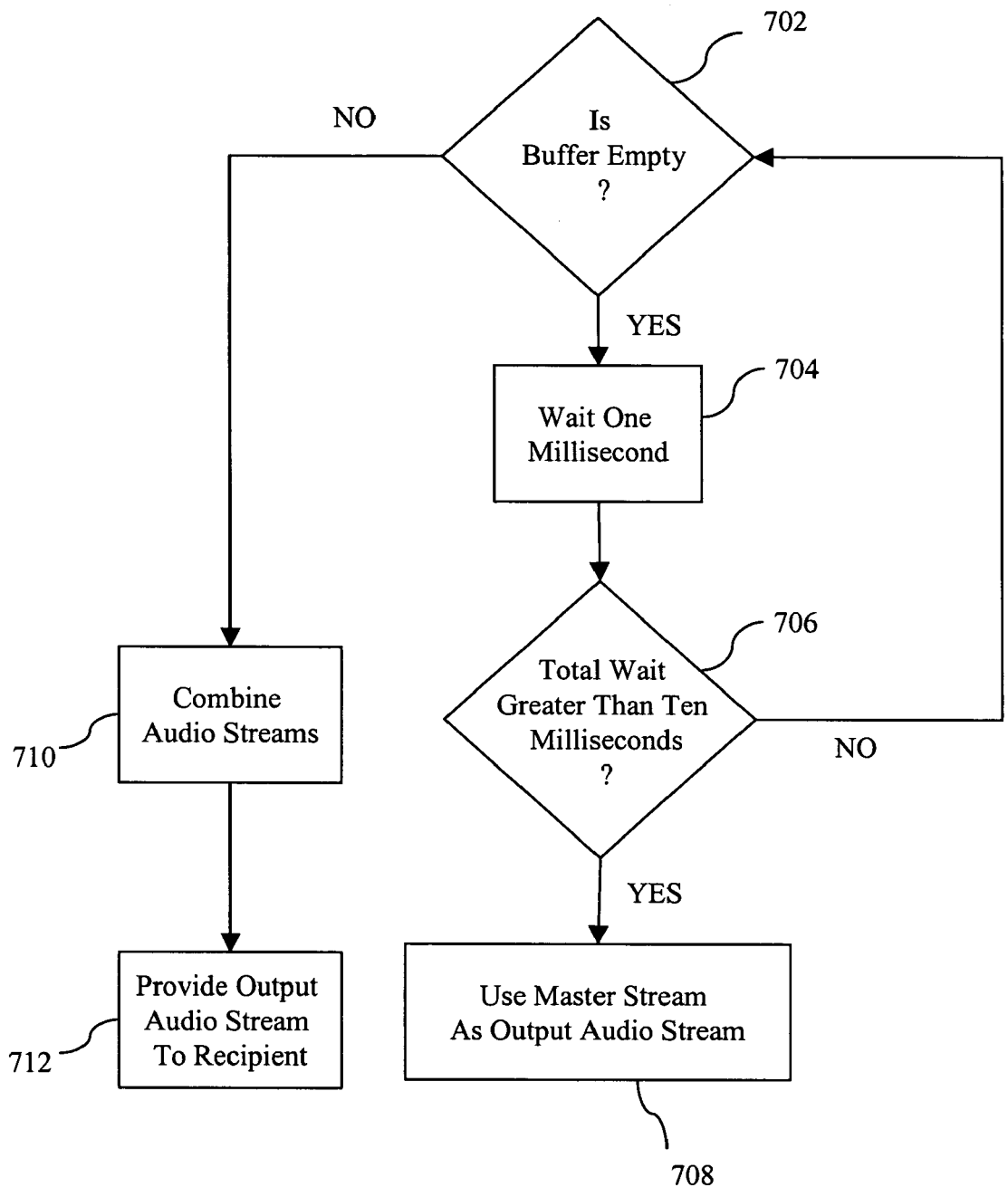
FIG. 7 is a simplified flowchart illustrating the steps carried out in relation to the combining of master audio data with previously buffered slave audio data according to one embodiment of the present invention.

FIG. 7 is a simplified flowchart illustrating the steps carried out in relation to the combining of audio data from master and slave audio streams with reference again to the components shown in FIG. 5, where the slave stream is buffered as described above. It will be understood that it is possible for buffer 530 to be empty, for example, when the master stream is arriving at the server (e.g., MCS 100) at a higher rate than the slave stream, or when the slave stream is experiencing network difficulties. If it is determined at step 702 that buffer 530 is empty (has no audio data stored from the slave stream), then at step 704, data mixer 550 (which, in this case, is an audio mixer) waits for a short period of time, e.g., one millisecond, for more data. If it is determined at step 706 that the total wait time has been greater than, e.g., ten milliseconds, then at step 708, the master audio data is sent to the output of data (audio) mixer 550 without waiting longer for slave audio data. This way, no master data is accumulated or lost waiting for slave data. Otherwise, when it is determined at step 706 that the total wait time has been less than or equal to, e.g., ten milliseconds, the process returns to step 702.

If it is determined at step 702 that buffer 530 is not empty, then the data (audio) mixer 550, for example, overwrites every other byte of a received audio packet of the master stream with a byte of data from a packet retrieved from buffer 530 (step 710). The partially overwritten audio packet then becomes a packet of the single output audio stream. This process repeats, and in this manner, two input streams of audio (from a master audio stream and a slave audio stream) are combined into a single audio output stream that includes, for example, alternating bytes or data segments from each of the incoming audio streams. At step 712, the combined audio stream is then optionally encoded (e.g., into AMR format), and delivered to the recipient (e.g., the wireless device of user 130).

It will be understood that, although copying (or overwriting) every other byte of data of a master stream data packet is described above, the invention is not limited in this manner. For example, the single output audio stream provided by data (audio) mixer 550 may include two or more bytes of data from the master stream, then two or more bytes of data from the slave stream, and so on. Moreover, it will be understood that any suitable number of audio media streams can be interleaved at either the rate at which the audio streams were sampled (usually 8 kHz) or a multiple thereof. For example, three audio streams can be combined according to the invention by labeling one stream the master stream, and the remainder two streams the slave streams. In this case, for example, both slave streams would be associated with a respective buffer, and the three audio streams would be interleaved in a manner similar to the interleaving of two audio streams explained above, but with three rather than two sources of audio packets. It will be understood that, generally speaking, any suitable combining algorithm may be used by a data mixer according to the invention in order to combine two (or more than two) audio streams. For example, telephoning conferencing algorithms such as those known by persons versed in the art may be used to combine two or more input audio streams, where the level (e.g., loudness) of the combined output audio stream is reduced to approximate the level of the individual input audio streams, for example. The invention is not limited in this manner.

Figure 8:
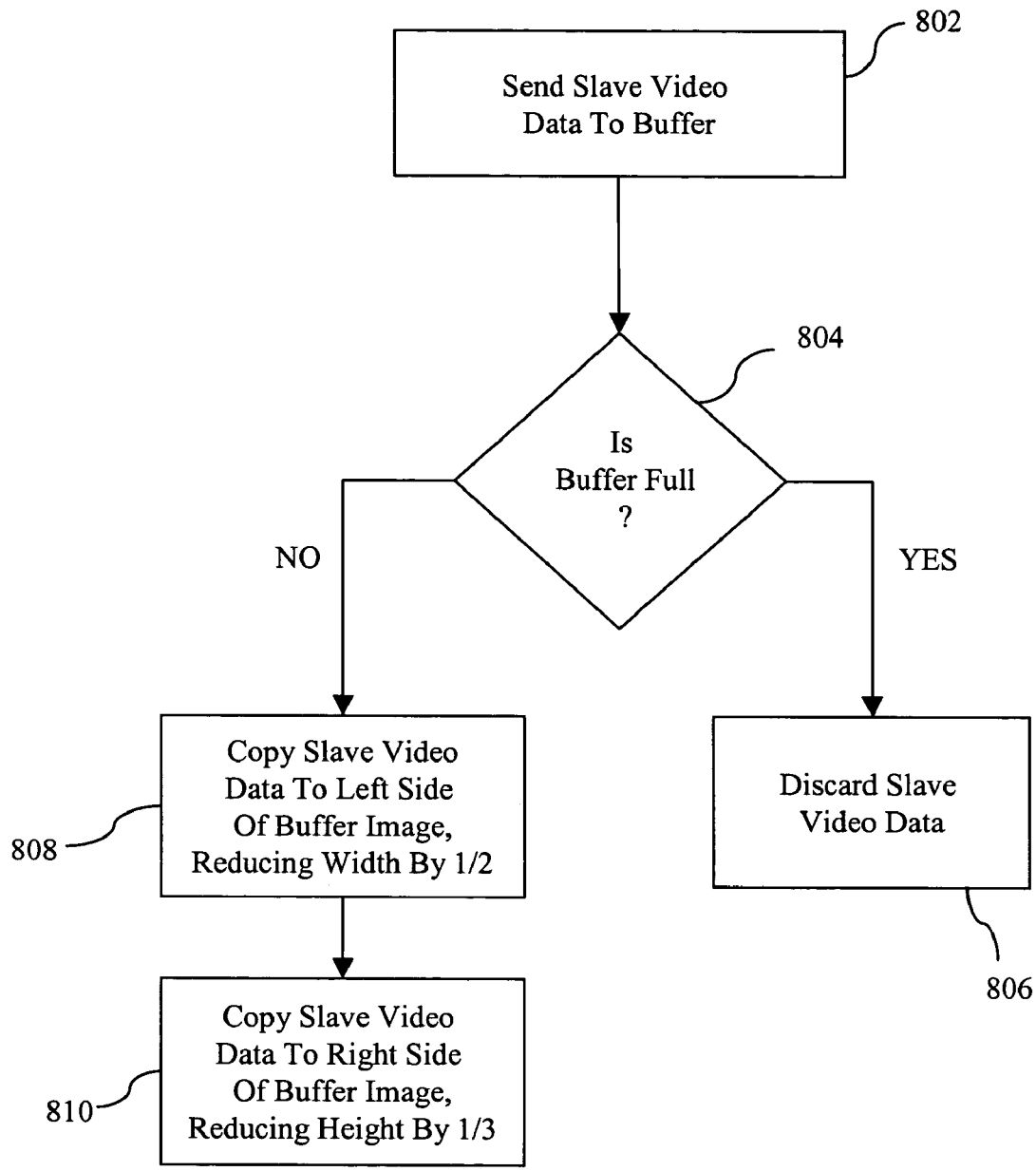
FIG. 8 is a simplified flow chart illustrating the steps carried out in relation to the buffering of video data from a slave stream, to be later combined with video data from a master stream, according to one embodiment of the present invention.

The use of a video mixer to combine video streams from two conferees (e.g., users 110 and 120) into a single output video stream for sending to a third conferee (e.g., user 130) is now discussed. FIG. 8 is a simplified flow chart illustrating the steps carried out in relation to the buffering of data from a slave video stream with respect to the components shown in FIG. 5 (e.g., assuming that packets 521, 522, etc. together make up one or more video frames and that data mixer 550 is a video mixer). At step 802, a video frame (e.g., the packets that make up one of the still images of a video "clip") is sent to buffer 530. If at step 804 it is determined that buffer 530 is full, then at step 806, the video frame is discarded (e.g., it is dropped or lost). This generally occurs when the master stream is interrupted for an appreciable amount of time, or "slips" behind the slave stream's data rate, causing buffer 530 to overflow (and thus causing video frames from the secondary stream to be lost until resynchronization occurs).

On the other hand, if it is determined at step 804 that buffer 530 is not full, at step 808, the video frame is copied to one side (e.g., the left side) of the buffer image. During this process, the width of the video frame is at least partially decimated. For example, while being copied to the left side of the buffer image, every other byte (in the width direction) of the video frame may be deleted (e.g., not copied to the left side of the buffer image). It will be understood that, while a ½ width decimation is described, the invention is not limited in this manner.

Next, at step 810, the width decimated video frame is copied to the right side of the buffer image, while at least partially decimating the video frame in the height direction. For example, every third byte of the video frame may be deleted (e.g., not copied to the right side of the buffer image) at this time. It will be understood that, while a ⅓ height decimation is described, the invention is not limited in this manner. Additionally, according to various embodiments of the present invention, the now twice decimated video image is centered in order to create a "letterbox" effect, whereby empty top and bottom portions are either left blank (noise), colored black, filled with text, etc.

It should be noted that, although width decimation prior to height decimation has been described above, the invention is not limited in this manner. Additionally, it will be understood that a video frame may be, for example, decimated in the width direction only, although this will result in a loss (or greater loss) of the original aspect radio of the video frame (assuming that the original aspect ratio is approximately one).

Figure 9:
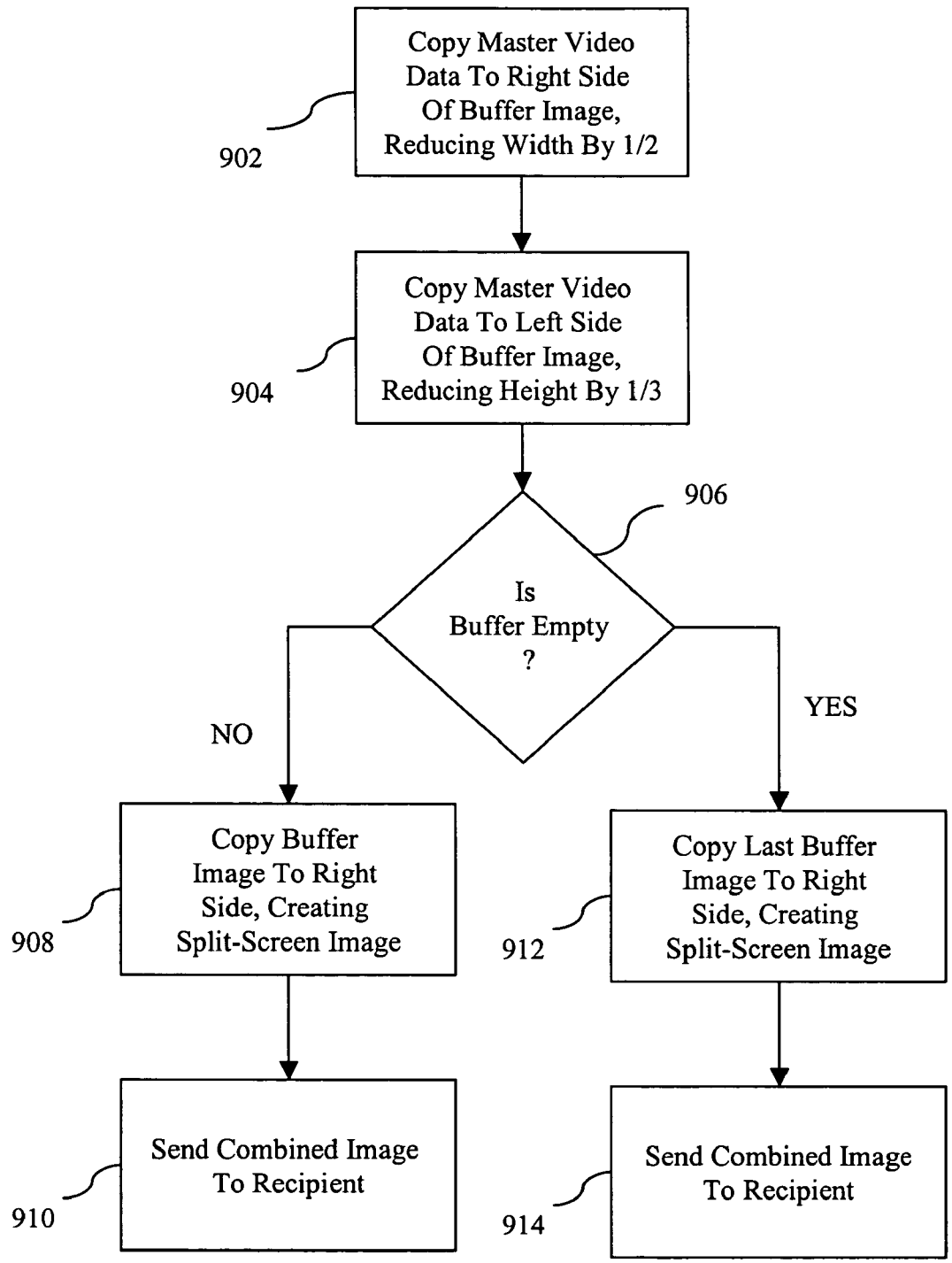
FIG. 9 is a simplified flowchart illustrating the steps carried out in relation to the combining of master video data with previously buffered slave video data according to one embodiment of the present invention.

FIG. 9 is a simplified flowchart illustrating the steps carried out in relation to the combining of video data (frames) from master and slave audio streams with reference again to the components shown in FIG. 5, where the slave stream is buffered as described above. It will be understood that it is possible for buffer 530 to be empty, for example, when the master stream is arriving at the server (e.g., MCS 100) at a higher rate than the slave stream, or when the slave stream is experiencing network difficulties.

At step 902, a frame from the master video stream is copied, for example, to the right side of the output image that will eventually be provided to a recipient (assuming the slave video frames are initially being copied to the left side of the buffer image). During this process, the width of the video frame is at least partially decimated. For example, as described above in connection with the slave video frame, every other byte of the master video frame in the width direction may be deleted (e.g., not copied to the right side of the output image). However, decimation by other than ½ in the width direction is also contemplated according to other embodiments of the invention.

Next, at step 904, the width decimated master video frame is copied to the left side of the output image, being at least partially decimated in the height direction. For example, every third byte of the video frame in the height direction may be deleted (e.g., not copied to the left side of the output image) at this time. Again, the invention is not limited to a ⅓ height decimation as just described. Moreover, although not required, the now twice decimated master video frame may be centered in order to create a "letterbox" effect, whereby empty top and bottom portions are either left blank (noise), colored black, filled with text, etc.

If it is determined at step 906 that buffer 530 is not empty (i.e., there is a buffer image of a twice decimated video frame from the slave stream), then at step 908, the buffer image is copied to the right side of the output image, placing it next to the twice decimated image from the master video frame. The combined video frame may then be sent to the recipient (e.g., user 130) at step 910. Otherwise, if it is determined at step 906 that buffer 530 is empty (does not have a stored buffer image), then at step 912, either a previously stored buffer image is repeated (copied to the right side of the output image), or the right side of the output image is either left empty (noise), made all black, etc. The combined video frame may then be sent to the recipient conferee (e.g., user 130) at step 914.

It will be understood that, although a waiting period such as with the combining of audio data is not described immediately above with respect to video frames, the invention is not limited in this manner. For example, a similar process of waiting a certain period of time for a slave video frame to be buffered may be implemented. It will be understood, however, that the repetition of video frames is not as problematic as with the repetition of audio data (which might resemble an echo or a stutter), and therefore, that a waiting period may not be necessary or desirable depending on the circumstances.

FIGS. 10A-10G provide an illustration of the effects of twice decimating and combining video frames from two video streams (a primary "P" video stream and a secondary "S" video stream) to form a single video frame ("P+S") that may be sent to a wireless device, processed, and displayed on the display screen of the wireless device. For example, the video frame shown in FIG. 10A may be an image of a first conference participant (e.g., user 110), while the video frame shown in FIG. 10B may be an image of a second conference participant (e.g., user 120). That is, FIG. 10A may show how a first conferee (e.g., user 110) would appear to the recipient (e.g., user 130) if the interactive communications session was not a conference session, but rather a one-to-one communication. Similarly, FIG. 10B may show how a second conferee (e.g., user 120) would appear to the recipient (e.g., user 130) if the interactive communications session was not a conference session, but rather a one-to-one communication. In order to distinguish the two stick figures, the one shown in FIG. 10A includes lowered arms while the one shown in FIG. 10B includes raised arms.

Once received and decoded at the conferencing server (e.g., MCS 100), as described above, the video frames shown in FIGS. 10A and 10B are both decimated in the width dimension by a factor of, for example, 1:2. Initially, these images are unchanged in the height dimension. This results in two unnaturally tall and narrow images (both occupying one half of the original image space), as shown in FIGS. 10C and 10D.

Figure 10A:
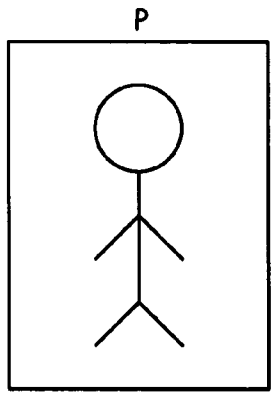
FIGS. 10A-10G are simplified illustrations showing respective video frames from a master video stream and a slave video stream during various steps of the combination process according to one embodiment of the present invention.
Figure 10B:
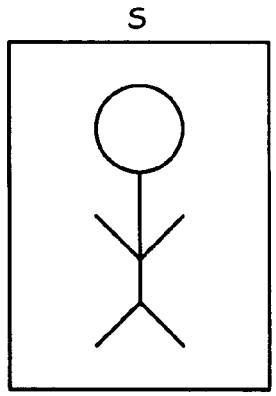
Figure 10C:
Figure 10C:
Figure 10C:
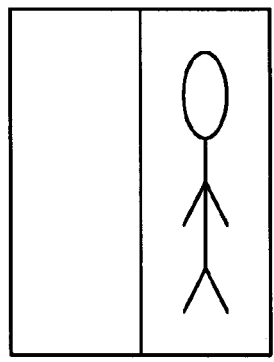
Figure 10D:
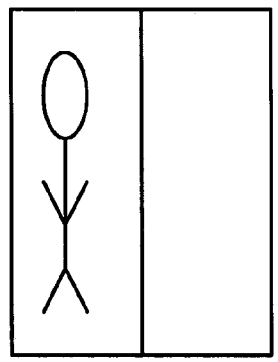

To give the unnatural images shown in FIGS. 10C and 10D a more natural look (and return them to a closer aspect ratio to the original), the images are again decimated, this time in the height dimension by a factor of, for example, 1:3. That is, for example, every third pixel in the height direction of the images shown in FIGS. 10C and 10D is discarded, resulting in the twice-decimated images shown in FIGS. 10E and 10F.

Figure 10E:
Figure 10E:
Figure 10E:
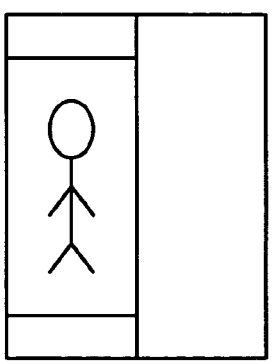
Figure 10F:
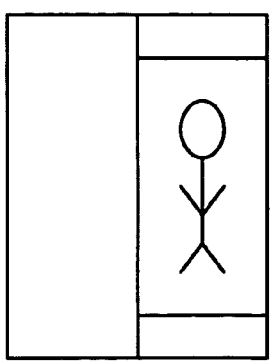
Figure 10G:
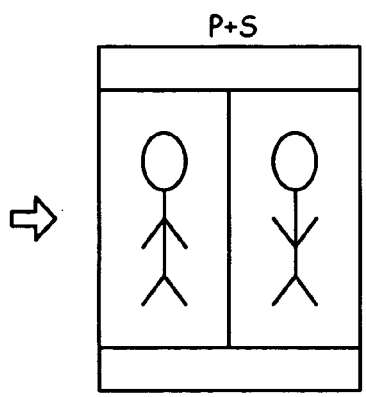

Finally, as described above, the video mixer combines the images shown in FIGS. 10E and 10F into the single image shown in FIG. 10G. The image shown in FIG. 10G includes the twice-decimated image of FIG. 10E on the left side, and the twice-decimated image of FIG. 10F on the right side. The image shown in FIG. 10G is then encoded and sent to a recipient, who can see both conferees (e.g., users 110 and 120) on a conventional video capable wireless device.

As described above, according to several embodiments of the present invention, the bands above and below the twice-compressed images shown in FIGS. 10E and 10F are made (or left) black. This technique of leaving some portion of a screen unused for the sake of achieving a desired aspect ratio on the screen is sometimes referred to as "letterboxing," and is commonly used when playing theatre-style movies on home television sets that have a different aspect ratio. According to various other embodiments of the invention, rather than being left black, these bands are colored, filled with nothing (noise), and/or are used to carry text, scrolling news, sports scores and/or time or date data, etc. This may be accomplished, for example, by adding additional video frames (e.g., with scrolling text information) to be added to the output video frame by the video mixer being used (e.g., mixer 550).

It can be seen from the above example that the video mixer and auxiliary components of MCS 100 combine the incoming video frames shown in FIGS. 10A and 10B into a single stream of video that is, for example, approximately the same size and bandwidth as any one of the original video streams. Accordingly, a recipient's device may be left unaware of this combining process, and can display the conferencing parties on the device's screen according to its normal operation. It will be understood that, according to various embodiments of the invention, the single stream of video that results from the repeated combination of images (such as those shown in FIGS. 10A and 10B) may also be made smaller in total size and bandwidth (or larger when the wireless device is capable of processing and/or displaying such a video stream). The invention is not limited in this manner.

Figure 11A:
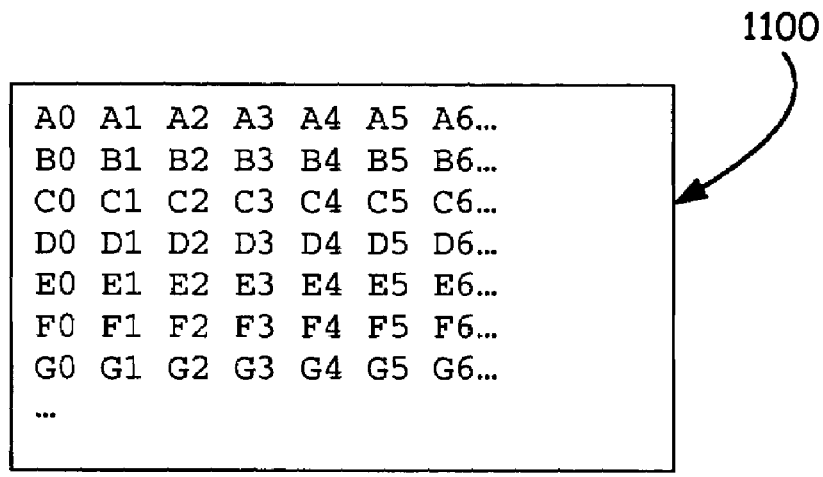
FIGS. 11A-11C are simplified illustrations showing the manner in which bytes from the slave video frame of FIG. 10B are manipulated during various steps of the combination process according to one embodiment of the present invention.
Figure 11B:
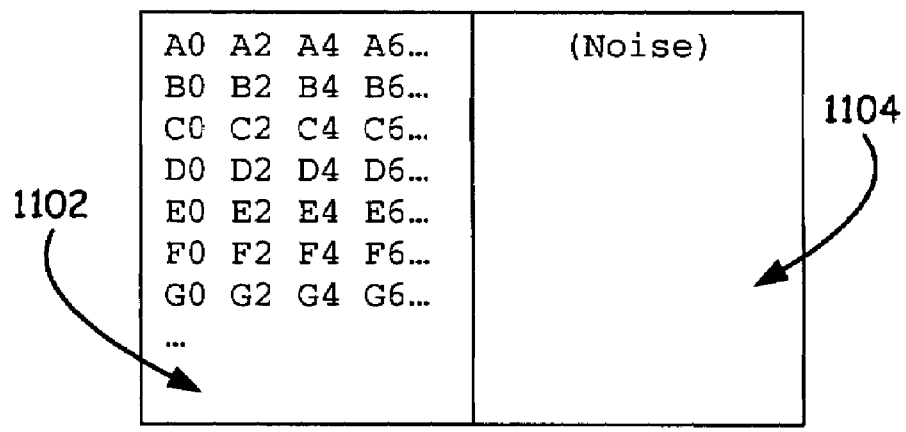
Figure 11C:
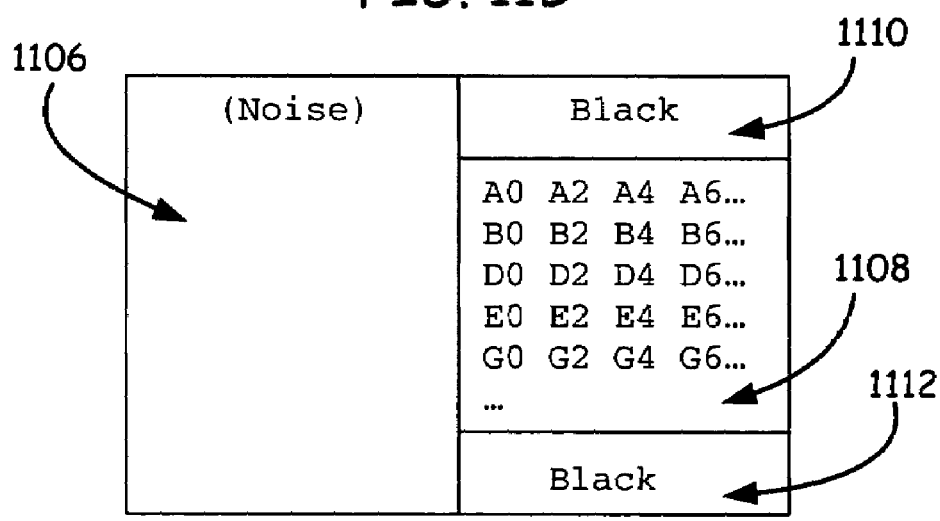

FIGS. 11A-11C illustrate the manipulation of video data according to several embodiments of the invention for combining two video streams into one. While only the processing involved in one incoming stream's data (e.g., the master media stream) is shown, it will be understood by persons versed in the art that the other (slave) stream may be similarly processed (but with the complementary left-right symmetry with respect to, e.g., a central vertical division of the screen or video memory). Moreover, will be understood by persons versed in the art that, as raw formats such as YU 4:2:0 generally contain three arrays of data, the representations shown FIGS. 11A-11C illustrative only one of these three arrays of data (e.g., the "Y" array).

FIG. 11A represents a complete image 1100, corresponding to that shown in FIG. 10B, where the bytes of data that make up a single image frame are represented by reference characters A0, A1, . . . A6, B0, B1, . . . B6, and so on. Although image 1100 of FIG. 11A takes up the entire available screen space, it will be understood that the invention is not limited in this manner.

FIG. 11B represents the contents of image 1100 after it has been decimated in the width dimension by discarding every other byte along the width of the image (corresponding to the image of FIG. 10D). That is, while copying image 1100 over to portion 1102 of FIG. 11B, bytes A1, A3, A5, . . . B1, B3, B5, and so on are discarded. Portion 1102 contains the remaining bytes of data, and, for example, the resulting half of the space 1104 is not filled with anything specific (as indicated by "Noise"). Generally speaking, the data that remains in the memory from a previous operation would still be in the unused parts of the memory, or it can be filled with zeros, black data, etc.

The data from portion 1102 of FIG. 1B is next decimated 1:3 in the height direction and is copied to the right side of the screen space to make up portion 1108 of FIG. 11C (corresponding to the image of FIG. 10F). The resulting ⅓ unused portions 1110 and 1112 are filled with black, other colors, other images, text, advertising, logos, streaming text, email, news, sports, weather information, etc as described above. In one embodiment, for example, a company's logo occupies the lower portion 1112, and the name or number of the conferee is displayed in portion 1110. Moreover, the left side of FIG. 11C (portion 1106) may be left unused, or, for example, filled with zeros. A similar process is carried out on the other incoming conferee's video stream, not shown, which is analogous to the images shown in FIGS. 10A, 10C, and 10E, as described above.

In this example, the two incoming video frames (corresponding to two conferees) are then combined as described above, and this combined video frame is sent to the intended recipient (e.g., user 130). The combined video frame sent to the intended recipient is shown in FIG. 12. Although the same reference characters are shown to make up the left side and right side of the combined video frame shown in FIG. 12, it will be understood that, generally speaking, these images will not be identical (unless identical video frames are being decimated and combined).

It will be understood by persons versed in the art that, if more than three conferees are involved, the input video streams are decimated by an appropriate amount to provide a single combined output video stream. An almost arbitrary number of conferees can therefore interact, with each participant's device only receiving a single video stream representing a combined input from all other participants. This requires no modification of the recipient's device to receive or transmit.

According to various other embodiments of the present invention, a video mixer may be used that combines two or more video frames, whereby at least one of the video frames is not decimated or otherwise reduced in size. For example, to achieve a lower bit rate while maintaining quality, the sources (e.g., wireless devices) of the master and slave video streams can be modified to send video frames having a non-standard image size (e.g., a resolution of 88×96). In this case, when the combined resolution of the multiple video frames permits, the video mixer would simply add the video frames together (e.g., side by side in the case of two sources of video), without deleting any data. In this case, the resulting image may also be a non-standard size, such as 176×96. It will be understood that, when the resolution of the frames being sent in the master and slave video streams is reduced in this manner, the sending (e.g., wireless) devices benefit from having to send less information (e.g., frames with a resolution of 88×96 rather than the typical QCIF resolution of 176×144). Additionally, the receiving wireless device showing the combined video frames benefits from having to receive less information (e.g., frames having a resolution of 176×96 rather than a resolution of 176×144). It is also contemplated that, depending on the size(s) of the received video frames to be combined, one or more (but not all) of these frames may need to be (and may in fact be) reduced as described herein such that the combined video frames are able to be processed and displayed by a receiving wireless device.

Regardless of the manner in which multiple video streams are combined into a single output video stream (e.g., using decimation of one or more video frames or not), persons versed in the art will appreciate that it may be desirable to synchronize the single output video stream with a corresponding single (combined) output audio stream that may have been obtained according to the present invention as described above. The synchronization of an output video stream with an associated output audio stream according to the invention can be accomplished using any suitable technique. For example, persons versed in the art will appreciate that audio and video streams are commonly carried in Real Time Protocol (RTP) packets, and that RTP streams often have associated RTP Control Protocol (RTCP) packets that contain timing information that can be used to synchronize playback of the audio and video streams. According to various embodiments of the present invention, therefore, synchronized playback of a single output video stream and a single output audio stream is achieved using timing information carried in RTCP packets. The invention, however, is not limited to this particular manner of synchronization.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, although decimation of video frames (e.g., by dropping every other byte in the width direction and every third byte in the height direction) has been described above as a way to reduce their sizes prior to combination, the invention is not limited in this manner. Rather, according to various embodiments of the present invention, video frames that must be reduced in size may instead be modified by averaging the color values of certain bytes. That is, according to the invention, it is contemplated that certain (e.g., consecutive) bytes of video frame may be replaced by one or more color averaged bytes (using any of a number of known techniques) in order to obtain a video frame that is smaller in size. This reduced size video frame may then be combined with another video frame that has either been decimated or similarly reduced in size, and the combined video frame may then be provided to and displayed by a wireless device.

Moreover, it will be understood that, although the invention is described with particular attention to the conferencing of both video and audio streams, the invention is not limited in this manner. Accordingly, single (still) images from multiple conference participants, for example, may also be combined and provided to another participant according to the principles of the present invention. Moreover, the concepts described can be extended to more than three conferees, possibly calling for decimation methods beyond those illustrated in the three-party examples above.

It will also be understood that, according to various embodiments of the present invention, video images (or other types of data) may be decimated at different ratios than those described above. Additionally, instead of placing video images side by side, they may stacked (one on top of the other), etc. in the recipient's screen. Moreover, when more than two users are providing video images, for example, the images may be displayed in block form (e.g., a two by two block of decimated images when video images from four participants are being combined). The invention is not limited in any of these manners.

It is also contemplated that, in more complex systems, both a master stream and a slave stream, whether audio or video, may be buffered (rather than only the slave stream, as described in detail above). In this case, unlike the single buffer embodiments, the master stream does not need to drive the mixer, which may run off of its own clock while pulling data from both the slave buffer and the master buffer. If there is no data available in one or both of the buffers, silence (in the case of audio) or a previous image (in the case of video) may be used as the data from the empty buffer(s).

Therefore, other embodiments, extensions, and modifications of the ideas presented above are comprehended and should be within the reach of one versed in the art upon reviewing the present disclosure. Accordingly, the scope of the present invention in its various aspects should not be limited by the examples presented above. The individual aspects of the present invention, and the entirety of the invention should be regarded so as to allow for such design modifications and future developments within the scope of the present disclosure. The present invention is limited only by the claims which follow.

What is claimed is:

1. A method for combining streams of data comprising:
   receiving a first stream of video data and a first stream of audio data from a first wireless device;
   receiving a second stream of video data and a second stream of audio data from a second wireless device;
   decimating at least one of the first and second streams of video data;
   combining the first and second streams of audio data into a single combined audio stream;
   combining the first and second streams of video data after decimating with additional data to form a combined stream of video data having data representing a single image space that includes each of said first and second streams of video data and the additional data that fills an unused portion of the single image space; and
   delivering the combined stream of video data and the single combined audio stream to a third wireless device.

2. The method of claim 1, further comprising decoding at least one of the received first and second streams of video data prior to decimating at least one of the first and second streams of video data, wherein the decimating comprises removing at least some portion of at least one of the first and second streams of video data.

3. The method of claim 1, further comprising encoding the combined stream of audio data prior to the delivering the combined stream of audio data to a third wireless device.

4. The method of claim 1, wherein at least one of the video data streams is encoded in the MPLG-4 format.

5. The method of claim 1, wherein the additional data in the combined video stream provides information to a user within a letterbox display format.

6. The method of claim 5, wherein the information provided comprises any of: a conference party's identity, service announcements, news, sports, or advertising information.

7. The method of claim 1, wherein at least one of the audio data streams is encoded in the AMR audio format.

8. The method of claim 1, further comprising buffering at least one of the first and second streams of video data in a buffer prior to the combining the remaining first and second streams of video data.

9. The method of claim 1, wherein the first stream of video data is decimated to fit into a first portion of image space and the second stream of video data is decimated to fit into a second portion of image space that is substantially different from the first portion of image space.

10. The method of claim 1, further comprising displaying the single image space on a single screen of the third wireless device.

11. The method of claim 1, wherein the decimating at least one of the first and second streams of video data comprises replacing at least a portion of at least one of the first and second streams of video data with color averaged values of that portion.

12. The method of claim 1, wherein the first and second streams of audio data is decimated by removing selected portions thereof and placing any portions not removed into the combined audio stream.

13. The method of claim 12, wherein the combined audio stream is a an interleaved audio data stream.

14. The method of claim 12, further comprising synchronizing the combined audio stream with a corresponding combined video stream.

15. The method of claim 14, wherein the synchronizing the combined audio stream with a corresponding combined video stream comprises using timing information contained in the packets of at least one of the combined audio stream and the combined video stream.

16. The method of claim 1, further comprising reducing the attributes of the combined stream of data based at least in part on bandwidth limitations.

17. The method of claim 1, further comprising encoding the combined stream of video data prior to the delivering the combined stream of video data to a third wireless device.

18. A method for combining streams of video data comprising:
   receiving a first stream of video data from a first wireless device that fits a first portion of image space;
   receiving a second stream of video data from a second wireless device that fits a second portion of image space that is substantially different from the first portion of image space; and
   combining the first and second portions of image space into a single image space and adding data to fill remaining space in the single image space to form a combined video stream that is suitable for sending to a third wireless device.

19. The method of claim 18, further comprising delivering the combined video stream to the third wireless device.

20. The method of claim 19, further comprising displaying the single image space on a single screen of the third wireless device.

21. The method of claim 18, further comprising buffering at least one of the first and second streams of video data in a buffer prior to the combining the remaining first and second streams of data.

22. A system for combining at least a first data stream received from a first wireless device and a second data stream received from a second wireless device into a combined data stream suitable for delivery to a third wireless device, the system comprising:

at least one data buffer for buffering at least one of a first video data stream and a second video data stream and buffering at least one of a first audio data stream and a second audio data stream; and a data mixer in operative communication with the at least one buffer for combining the first video data stream with the second video data stream and additional data to form a combined data stream having data representing a single image space including the additional data to fill remaining image space and both of the first and second data streams, and the data mixer combining at least the first audio data stream and the second audio data stream into a combined audio stream.

23. The system of claim 22, wherein the data mixer decimates at least a portion of at least one of the first video data stream and the second video data stream after buffering occurs.

24. The system of claim 22, further comprising at least one decoder for decoding at least one of the first and second audio data streams prior to the combining of the first and second audio data streams by the data mixer.

25. The system of claim 22, further comprising an encoder for encoding the combined video data stream prior to delivery to the third wireless device.

26. A system for combining at least a first data stream received from a first wireless device and a second data stream received from a second wireless device into a combined data stream suitable for delivery to a third wireless device, the system comprising:

means for buffering at least one of a first video data stream and a second video data stream and second means for buffering at least one of a first audio data stream and a second audio data stream; and means for combining the first data video stream with the second video data stream and additional data to form a combined video data stream having data representing a single image space including the additional data to fill remaining image space and both of the first and second data streams, and means for combining at least the first audio data stream and the second audio data stream into a combined audio stream.

27. The system of claim 26, further comprising means for decoding at least one of the first and second audio data streams prior to the combining of the first and second audio data streams.

28. The system of claim 26, further comprising means for encoding the combined video data stream prior to delivery to the third wireless device.

29. A data mixer that receives at least a first video data stream from a first wireless device and a second video data stream from a second wireless device, the data mixer combining at least some of the first video data stream with at least some of the second video data stream and additional data to form a combined data stream having data representing a single image space including the additional data to fill remaining image space and both of the first and second video data streams, wherein the combined data stream is suitable for delivery to a third wireless device.

* * * * *